United States Patent
Kleppner

(10) Patent No.: US 6,474,374 B1
(45) Date of Patent: *Nov. 5, 2002

(54) DEVICE FOR FILLING A RESERVOIR OF A FUEL SUPPLY MODULE AND FUEL SUPPLY MODULE INCLUDING SAID DEVICE

(75) Inventor: Stephan Kleppner, Bretten (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/605,348

(22) Filed: Jun. 28, 2000

(30) Foreign Application Priority Data

Jul. 2, 1999 (DE) .......................... 199 30 595

(51) Int. Cl.7 .............................. B65B 1/30; B65B 3/28; B65B 57/06; B65B 57/14; B67C 3/00
(52) U.S. Cl. ........................ 141/198; 141/192; 141/199; 123/509
(58) Field of Search ................ 141/18, 83, 94, 141/95, 113, 192, 198, 199, 285; 123/509, 510, 514, 516

(56) References Cited

U.S. PATENT DOCUMENTS

| 4,706,707 A | | 11/1987 | Betterton et al. | |
|---|---|---|---|---|
| 4,831,990 A | * | 5/1989 | Tuckey | 123/514 |
| 5,363,827 A | | 11/1994 | Siekmann | |
| 5,642,719 A | * | 7/1997 | Brown | 123/509 |
| 5,724,947 A | * | 3/1998 | Takaki et al. | 123/509 |
| 5,992,394 A | * | 11/1999 | Mukaidani et al. | 123/509 |

FOREIGN PATENT DOCUMENTS

| DE | 43 37 183 A1 | 5/1995 |
|---|---|---|
| DE | 195 49 192 A1 | 7/1997 |
| DE | 198 13 172 A1 | 9/1999 |

* cited by examiner

Primary Examiner—Timothy L. Maust
(74) Attorney, Agent, or Firm—Michael J. Striker

(57) ABSTRACT

The device for filling the reservoir (2) of a fuel supply module (1) is arranged in the reservoir (2), which is connected on a low-pressure side with an interior of a fuel tank (11) and on a high-pressure side with an internal combustion engine. The reservoir (2) including a fuel feed unit (5) is arranged in a fuel tank and is provided with an opening (10) in a lower portion thereof for admission of the fuel from the fuel tank. The device for filling the reservoir (2) includes a pivotable lever arm (15) pivotally mounted in the reservoir (2), a movable closure element (8) arranged in the reservoir (2) and mounted on one end of the lever arm (15) and a float element (16) arranged in the reservoir on another end of the lever arm (15) so as to close the opening or to open the opening (10) according to a fuel level (20) of fuel contained in the reservoir (2).

8 Claims, 2 Drawing Sheets

DEVICE FOR FILLING A RESERVOIR OF A FUEL SUPPLY MODULE AND FUEL SUPPLY MODULE INCLUDING SAID DEVICE

BACKGROUND OF THE INVENTION

1. Field of the Invention

The present invention relates to a device for filling a reservoir of a fuel supply module, in which a fuel feed unit is surrounded, e.g., by a container to be filled, and to the fuel supply module and fuel supply system containing that device.

2. Prior Art

A device for feeding fuel from a supply container or reservoir to an internal combustion engine of a motor vehicle is described in DE 195 49 192 A1. The fuel feed unit is connected on its low-pressure side with the supply container and on its high-pressure side with the internal combustion engine. The internal combustion engine has a fuel return line, which leads to a jet pump arranged near the tank bottom. This jet pump feeds the excess fuel back into the supply container from the return line through a mixing region in the supply container. The fuel feed unit takes the fuel from the supply container. A siphon-like mixing region is provided between the supply container and the tank bottom, which has an opening in a transitional region to the supply container, which is closable with a closure element.

The closure element is mounted in a guide of a filter element by means of a longitudinally movable pin. Under certain circumstances, such as a low fuel level in the fuel tank the fuel level is no longer sufficient to open a heavy closure element. Thus filling of the supply container cannot occur. As a result, starting problems occur. If the closure element sticks in its guide, fuel can slowly leak from the supply container, which can lead to an emptying of the container and similarly can cause starting problems.

SUMMARY OF THE INVENTION

It is an object of the present invention to provide a device for filling a reservoir of a fuel supply module of the above-described kind, which does not suffer from the above-described disadvantages.

It is another object of the present invention to provide an improved fuel supply module and fuel supply system including the device for filling the reservoir according to the invention.

According to the invention the device for filling the reservoir of a fuel supply module, which is connected on its low-pressure side with an interior of a fuel tank and on its high-pressure side with an internal combustion engine, the reservoir including a fuel feed unit and provided with an opening in a lower portion thereof, includes a movable closure element arranged in the reservoir in the lower portion of the reservoir and a float element arranged in the reservoir and connected with the movable closure element to close the opening or to open the opening in the lower portion of the reservoir according to a fuel level in the reservoir.

In the device for filling the reservoir of the fuel supply module according to the invention the closure element does not stick in a guide, so that the filling of the reservoir takes place without failure because of a sticking filling valve. The hydrostatic pressure acting on a preferably umbrella-shaped closure element in the filled reservoir provides a satisfactory sealing of the opening at the base of the reservoir, so that gradual emptying of the reservoir when the fuel level in the tank is low does not occur. Optimum operation of a primary filling valve and a reliable seal of the reservoir from the outside is guaranteed by the structure of the apparatus according to the invention. Thus it is possible to start the motor vehicle each time, since both a sealing of the reservoir to prevent it from slowly running empty and also an unhindered fuel flow into the reservoir is guaranteed when the level of fuel in the tank is low.

In an advantageous embodiment of the invention the closure element and the float element are arranged on a common pivoting lever arm. Easy operation of the resulting filling valve formed in this way is guaranteed by balancing the torque about the pivot point or rotation axis of this common lever arm. The common lever arm is pivoted about a somewhat elevated rotation axis so as to open and close the valve.

In an especially preferred embodiment the closure element, which is operated by means of the float element, can be formed by an umbrella-shaped valve cover. It has a surface that is gently curved in order to distribute the hydrostatic pressure uniformly and sit on the valve seat, thus providing a tight closure of the opening. The float element and the closure element are advantageously located on opposite ends of the common lever arm.

In a particularly preferred embodiment of the closure element it can be attached to the common lever arm by means of an adjustable attaching element, which guarantees a precise adjustment during the first assembly of the fuel supply module. The float element can be attached to the common pivoting lever arm, so that it is pivotally mounted on the lever arm so that it can be level with the fuel level in the reservoir.

The device for filling a reservoir of the fuel supply module can advantageously be provided in a fuel supply module, which is part of a fuel supply system for the internal combustion engine.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
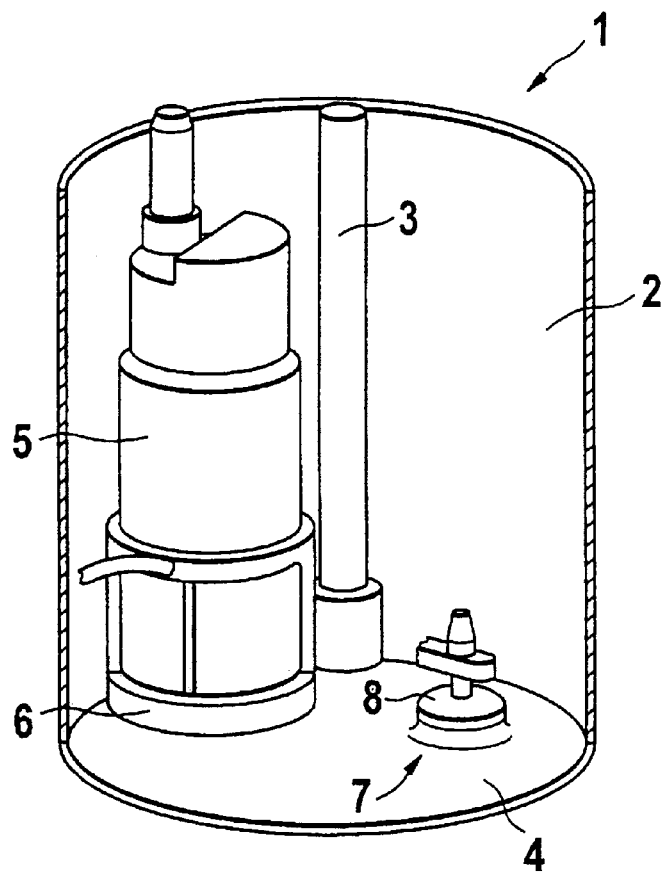
FIG. 1 is a cutaway perspective view of an interior of the fuel supply module according to the invention showing built-in parts.

FIG. 1 is a view of the interior of a fuel supply module with some of the built-in parts shown.

The fuel supply module 1 comprises a reservoir 2, which is continuously filled in operation by means of a vertical pipe 3, as soon as the fuel level reaches and exceeds a predetermined level in the fuel tank. A fuel feed unit 5 is arranged upright in the reservoir 2 and is attached by means of a holder 6 in the reservoir 2. A device 7 for primary filling the reservoir 2, i.e. the primary filling valve, which includes the valve cover 8, is shown in a very simplified manner only schematically in the reservoir bottom 4.

The fuel feed unit 5 attached in the reservoir 2 by means of the holder 6 can be e.g. an electric fuel pump. It is connected on its low-pressure side with the fuel tank and on its high-pressure side with the high-pressure part of a fuel supply system, which feeds fuel to the injector valves in the combustion chambers. The form and arrangement of the fuel feed unit 5 are however not the subject matter of the present invention. A primary filling valve 7 is provided on the bottom 4 of the reservoir 2 for primary filling of the reservoir 2, which includes the fuel supply unit 5. This primary filling valve 7 provides a first or primary filling of the reservoir 2 when the level of fuel in the fuel tank is under the opening of the vertical pipe 3. This filling valve 7 guarantees that the fuel feed unit 5 can provide fuel for the starting process and bring a low pressure level up to a high pressure level.

Figure 2:
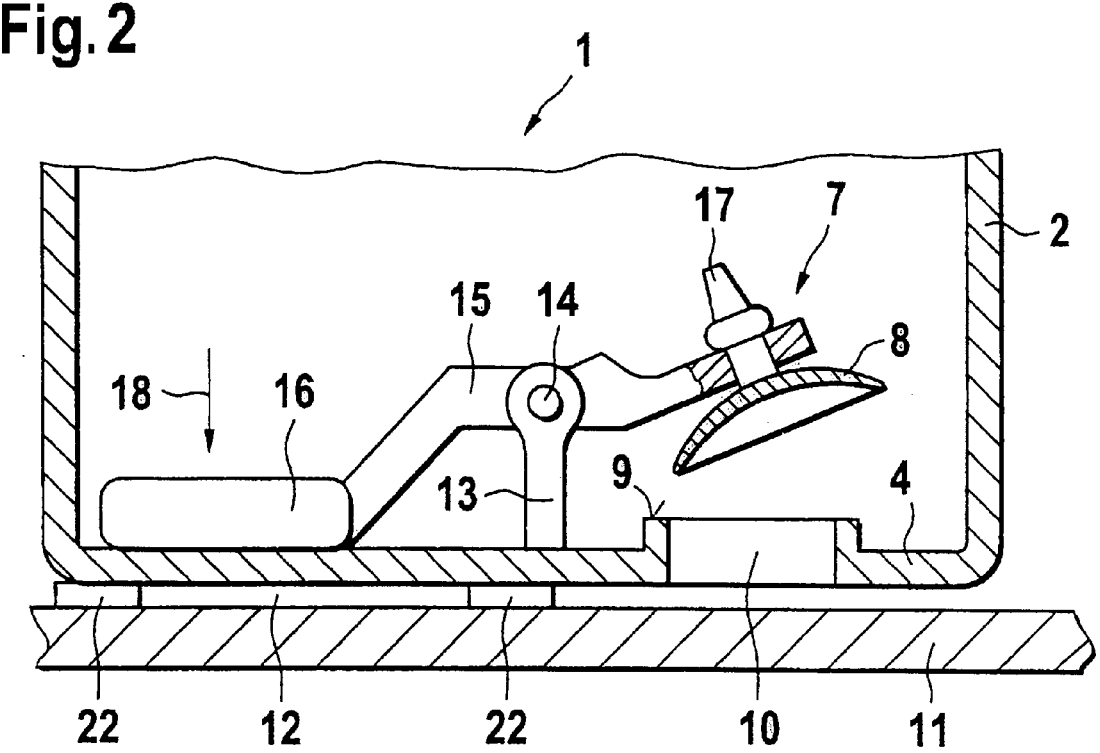
FIG. 2 is a cross-sectional view through a device for filling the reservoir of the fuel supply module in an open state.
Figure 3:
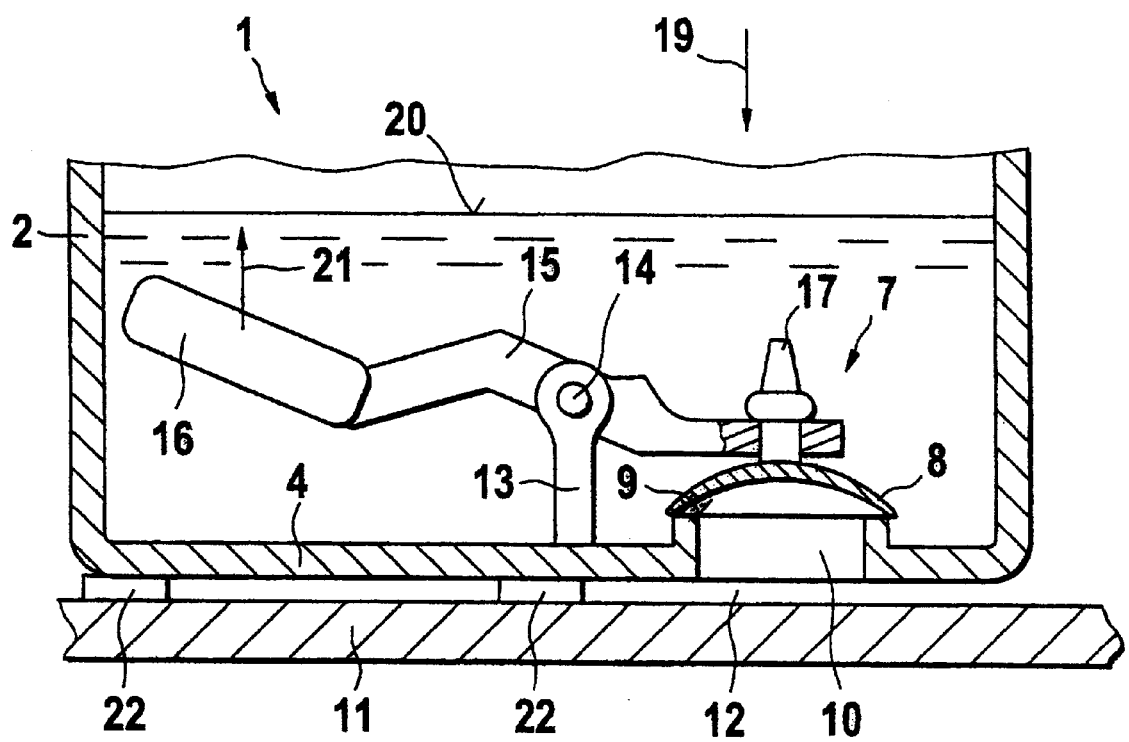
FIG. 3 is a cross-sectional view through a device for filling the reservoir of the fuel supply module in a closed state.

The device for filling the reservoir 2 of the fuel supply module is shown in FIG. 2 with the reservoir in an unfilled empty state.

The reservoir 2 of the fuel supply module 1 can be, for example, cylindrical, made from metal and have a pot-like shape. Besides the simple pot shape other shapes are conceivable for the reservoir 2, which however are not shown here. The reservoir—here shown in an empty state 18—is mounted on supports or feet 22 on a tank bottom 11 of an otherwise unshown fuel tank. A gap 12 between the bottom 4 of the reservoir 2 and the tank bottom 11 is formed by means of the supports 22, which are spaced from each other. The gap 12 itself is filled with fuel when the level of fuel is at its lowest in the fuel tank, so that fuel continuously arrives at the opening 10 of the reservoir bottom 4. It flows into the reservoir 2 through the opening 10 in the reservoir bottom 4, as soon as a primary filling valve opens in the reservoir bottom 4.

For example, a pivot mount 13, which has a lever arm 15 pivotally mounted on pivot 14, is attached to the reservoir bottom 4. A float element 16 is mounted on one end of the lever arm 15. The pivoting closure element 8 is provided on the other end of the lever arm 15 opposite from the end having the float element 16. In the preferred embodiment shown in the drawing the closure element 8 is an umbrella-shaped valve cap. The umbrella-shaped valve cap is received on the end of the lever arm 15, which receives the float element 16 on its other end, by means of an adjustable attaching element 17. The attaching element 17 allows a fine adjustment of the position of the valve cap 8 in relation to a valve seat 9 at the opening 10 in the reservoir bottom 4 and in relation to the end of the lever arm 15.

When the reservoir 2 is in the empty state or condition the float element 16 rests on the bottom 4 of the reservoir 2, since no buoyant forces act on it. Because of that the shorter portion of the lever arm 15 provided with the closure 3 produces a hydrostatic pressure on the gently curved surface of the closure element 8, on the one hand, and the buoyant forces act on the float element 16, on the other hand. As a result, the opening 10 is reliably sealed, thus preventing gradual emptying of the reservoir 2. The fuel feed unit 5 in the reservoir 2 according to FIG. 1 can now feed fuel to the internal combustion engine.

The fuel level 20 may fluctuate in the reservoir 2, perhaps because of shifting of weight or during travel over comparatively long climbs or descents. In that case float element 16 drops in the direction of the reservoir bottom 4, so that the opening 10 to the gap 12 is opened and fuel flows through the opening 10 thus guaranteeing that fuel fills the reservoir 2 to a sufficient height.

The lever arm 15 can have a gently bent form so as to guarantee a maximum opening of the closure element 8, when the float element 16 rests on the reservoir bottom 4. Instead of the umbrella-like configuration the closure element 8 can also have a truncated conical shape or a hemispherical ball shape. The contacting surface of the valve seat 9 can be formed to fit the shape of a contacting surface of the closure element 8 in the form of a peripheral shoulder. An improved sealing of the opening 10 by the closure element 8 operable by means of the float element 16 is thus provided.

The disclosure in German Patent Application 199 30 595.1-13 of Jul. 2, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a device for filling a reservoir of a fuel supply module and fuel supply module including said device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A device for filling a reservoir (2) of a fuel supply module (1), said resevior (2) being connected on a low-pressure side with an interior of a fuel tank (11) and on a high-pressure side with an internal combustion engine, said reservoir (2) including a fuel feed unit (5) and provided with an opening (10) in a lower portion thereof, said device for filling the reservoir (2) comprising a movable closure element (8) for the opening arranged in the lower portion of the resevoir (2) and a float element (16) for operating the movable closure element (8) to open the opening or to close the opening according to a fuel level (20) in the resevoir, wherein said float element (16) and said movable closure element (8) are jointly mounted on a common lever arm (15) and said movable closure element (8) is connected with the common lever arm (15) by means of an adjustable attaching element (17).

2. The device as defined in claim 1, further comprising means (13,14) for pivotally mounting the pivotable lever arm (15) in said reservoir (2).

3. The device as defined in claim 1, wherein said movable closure element (8) is an umbrella-shaped valve cap.

4. The device as defined in claim 1, further comprising a valve seat (9) for engagement with the movable closure element (8), said valve seat (9) being arranged at the opening (10) in the reservoir (2).

5. The device as defined in claim 1, wherein said float element (16) and the movable closure element (8) are arranged at opposite ends of the pivotable lever arm (15).

6. The device as defined in claim 1, further comprising an adjustable attaching element (17) for connecting the closure element (8) with the pivotable lever arm (15).

7. A device for filling a reservoir of a fuel supply module (1), which is connected on a low-pressure side with an interior of a fuel tank (11) and on a high-pressure side with an internal combustion engine, said reservoir (2) including a fuel feed unit (5) and provided with an opening (10) in a lower portion thereof, said device for filling the reservoir (2) comprising a pivotable lever arm (15) pivotally mounted on a pivot mount (13) extending from a bottom (4) of the reservoir (2);

a movable closure element (8) formed for closing the opening (10) connected to one end of the lever arm (15) by means of an adjustable attaching element (17) for fine adjustment of a position of the closure element (8);

a valve seat (9) provided around the opening (10) and formed for closure by means of the closure element (8); and a float element (16) for operating the movable closure element (8) to close the opening or to open the opening according to a fuel level (20) in the reservoir (2), said float element (16) being pivotally attached to another end of the lever arm opposite from the one end attached to the closure element (8);

wherein said pivotable lever arm (15), said float element (8), said valve seat (9) and said closure element (8) are formed and positioned in said reservoir, whereby said opening (10) is closed by said closure element (8) or opened according to the fuel level (20) in said reservoir (2).

8. The device as defined in claim 10, wherein said movable closure element (8) is an umbrella-shaped valve cap.

* * * * *